United States Patent
Okuno

(10) Patent No.: US 11,967,095 B2
(45) Date of Patent: Apr. 23, 2024

(54) IMAGE PROCESSING SYSTEM AND IMAGE PROCESSING METHOD

(71) Applicant: OMRON Corporation, Kyoto (JP)

(72) Inventor: Motoharu Okuno, Fukuchiyama (JP)

(73) Assignee: OMRON Corporation, Kyoto (JP)

(*) Notice: Subject to any disclaimer, the term of this patent is extended or adjusted under 35 U.S.C. 154(b) by 733 days.

(21) Appl. No.: 17/053,345

(22) PCT Filed: May 30, 2019

(86) PCT No.: PCT/JP2019/021498
§ 371 (c)(1),
(2) Date: Nov. 5, 2020

(87) PCT Pub. No.: WO2019/244593
PCT Pub. Date: Dec. 26, 2019

(65) Prior Publication Data
US 2021/0104057 A1    Apr. 8, 2021

(30) Foreign Application Priority Data
Jun. 18, 2018  (JP) .................. 2018-115262

(51) Int. Cl.
*G06T 7/521* (2017.01)
*G01B 11/25* (2006.01)
(Continued)

(52) U.S. Cl.
CPC ............ *G06T 7/521* (2017.01); *G01B 11/254* (2013.01); *G06T 7/60* (2013.01); *G06T 7/97* (2017.01); *G06T 11/00* (2013.01)

(58) Field of Classification Search
CPC .. G06T 7/60; G06T 7/97; G06T 7/521; G06T 11/00; G01B 11/254
See application file for complete search history.

(56) References Cited

U.S. PATENT DOCUMENTS

2016/0275689 A1* 9/2016 Fujii ................. G01B 11/24

FOREIGN PATENT DOCUMENTS

| JP | 2008046749 | 2/2008 |
|----|------------|--------|
| JP | 2008275366 | 11/2008 |

(Continued)

OTHER PUBLICATIONS

Computer English translation of JP2016191648 A (Year: 2016).*
(Continued)

*Primary Examiner* — Daniel G Mariam
(74) *Attorney, Agent, or Firm* — JCIPRNET

(57) ABSTRACT

This image processing system is provided with: a measurement part which measures the three-dimensional shape of a target object based on a captured image obtained by capturing an image of the target object; a reliability calculation part which calculates, for each area, an index that indicates the reliability in the measurement of the three-dimensional shape; a reliability evaluation part which evaluates, for each area, whether the calculated index satisfies a predetermined criterion; and a display part which simultaneously or selectively displays the measurement result of the three-dimensional shape and a result image that shows the area that does not satisfy the criterion in the captured image.

13 Claims, 12 Drawing Sheets

(51) Int. Cl.
*G06T 7/00* (2017.01)
*G06T 7/60* (2017.01)
*G06T 11/00* (2006.01)

(56) References Cited

FOREIGN PATENT DOCUMENTS

| | | |
|---|---|---|
| JP | 2014109489 | 6/2014 |
| JP | 2016191648 | 11/2016 |
| JP | 2017101992 | 6/2017 |
| JP | 2017162055 | 9/2017 |
| JP | 2018041169 | 3/2018 |
| JP | 2018045396 | 3/2018 |
| JP | 2018084571 | 5/2018 |
| WO | 2013175595 | 11/2013 |
| WO | 2017043258 | 3/2017 |
| WO | 2017154706 | 9/2017 |

OTHER PUBLICATIONS

Computer English translation of JP2017162055 A (Year: 2017).*
Computer English translation of JP2018045396 (Year: 2018).*
Computer English translation of WO2013/175595 A1 (Year: 2013).*
Computer English translation of WO2017043258 A1 (Year: 2017).*
Computer English translation of JP2008046749 A (Year: 2008).*
Computer English translation of JP2018041169 A (Year: 2018).*
International Search Report (Form PCT/ISA/210) of PCT/JP2019/021498, dated Jun. 25, 2019, with English translation thereof, pp. 1-4.
"Written Opinion of the International Searching Authority (Form PCT/ISA/237)" of PCT/JP2019/021498, dated Jun. 25, 2019, with English translation thereof, pp. 1-10.
Office Action of Japan Counterpart Application, with English translation thereof, dated Jan. 4, 2022, pp. 1-10.

* cited by examiner (A) three-dimensional measurement (B) display of area not satisfying criterion (having low reliability)

IMAGE PROCESSING SYSTEM AND IMAGE PROCESSING METHOD

CROSS-REFERENCE TO RELATED APPLICATION

This application is a 371 application of the International PCT application serial no. PCT/JP2019/021498, filed on May 30, 2019, which claims the priority benefit of Japanese Patent Application No. 2018-115262, filed on Jun. 18, 2018. The entirety of each of the above-mentioned patent applications is hereby incorporated by reference herein and made a part of this specification.

BACKGROUND

Technical Field

The present disclosure relates to an image processing system and an image processing method.

Related Art

Conventionally, three-dimensional measurement devices that perform three-dimensional measurement of target objects are known.

As such a three-dimensional measurement device, for example, in Japanese Patent Application Laid-Open No. 2008-275366 (Patent Literature 1), a stereo three-dimensional measurement system that performs three-dimensional measurement of a still object (target object) by searching for corresponding positions between stereo images has been disclosed. This stereo three-dimensional measurement system measures a distance to a still object and displays a measurement result acquired through measurement in a display device.

CITATION LIST

Patent Literature

Patent Literature 1: Japanese Patent Application Laid-Open No. 2008-275366

SUMMARY

Technical Problem

Relating to three-dimensional measurement, in order to acquire measurement results having high reliability, an index representing a reliability of three-dimensional measurement needs to satisfy criteria.

However, in the stereo three-dimensional measurement system disclosed in Patent Literature 1, although a user may be able to visually check measurement results or a captured image, the user may not be able to determine whether or not the index described above satisfies criteria. In particular, it is extremely difficult to identify an area for which the index described above does not satisfy criteria through a user viewing measurement results or a captured image.

The present disclosure is in view of the problems described above, and an objective thereof is to provide an image processing device and an image processing method supporting acquisition of measurement results having high reliability.

Solution to Problem

According to a certain aspect of the present disclosure, there is provided an image processing system including: a measurement part configured to measure a three-dimensional shape of a target object based on a first captured image acquired by imaging the target object; a reliability calculation part configured to calculate a first index representing a reliability of measurement of the three-dimensional shape for each of areas based on the first captured image; a reliability evaluation part configured to evaluate whether or not the calculated first index satisfies a first criterion set in advance for each area; and a display part configured to display a measurement result of the three-dimensional shape and a result image representing an area not satisfying the first criterion in the first captured image simultaneously or selectively.

According to the configuration described above, by visually checking a result image displayed in the display part, a user can ascertain whether or not a calculated index satisfies the criterion for each area. Therefore, according to the three-dimensional measurement system, acquisition of a measurement result having high reliability can be supported.

Preferably, the reliability calculation part further calculates a second index representing the reliability for each area based on the first captured image. The reliability evaluation part further evaluates whether or not the calculated second index satisfies a second criterion set in advance for each area. The result image further represents an area not satisfying the second criterion in the first captured image.

According to the configuration described above, a user can recognize whether or not each calculated index satisfies the criterion for each area.

Preferably, the display part displays an area not satisfying the first criterion in a first form and displays an area not satisfying the second criterion in a second form.

According to the configuration described above, a user can visually check and distinguish between an area not satisfying the first criterion for the first index and an area not satisfying the second criterion for the second index.

Preferably, the display part displays the result image in a state of being superimposed on the first captured image.

According to the configuration described above, a user can visually recognize the result image together with the captured image acquired by imaging the target object.

Preferably, the display part displays the result image in a state of being superimposed on the measurement result.

According to the configuration described above, a user can visually recognize the result image together with the measurement results.

Preferably, the image processing system further includes: a projection part configured to project a spatial pattern set in advance on a subject; and an imaging part configured to image the target object. The imaging part generates the first captured image by imaging the target object in a state in which the spatial pattern is projected on the target object. The measurement part detects a pattern appearing in the first captured image and measures a three-dimensional shape of the target object based on a result of the detection. The imaging part generates a second captured image by further imaging the target object in a state in which the spatial pattern is not projected. The display part displays the result image in a state of being superimposed on the second captured image.

According to the configuration described above, a user can visually recognize the result image together with the captured image of the target object in a state in which the spatial pattern is not projected.

Preferably, in a case in which imaging of the target object is performed a plurality of times, when one of a plurality of first captured images acquired through imaging a plurality of times is designated, the display part displays the result image, which is acquired using the first captured image, in a state of being superimposed on the designated first captured image.

According to the configuration described above, in a case in which a plurality of captured images are acquired, the image processing system can display the result image for one captured image that has been designated.

Preferably, in a case in which imaging of the target object is performed a plurality of times, the display part displays a plurality of result images in a state in which the result images, which are acquired using the first captured images, are respectively superimposed on a plurality of the first captured images acquired through the imaging of the plurality of times.

According to the configuration described above, the image processing system displays a result image which is superimposed on each of the plurality of captured images. Thus, a user can check whether or not each index calculated in each measurement satisfies each of criteria for each area on one screen display.

Preferably, the imaging of the plurality of times is imaging from mutually-different positions.

According to the configuration described above, a suitability (quality) of an imaging position can be objectively evaluated.

Preferably, in the first form and the second form, hatching patterns or blinking patterns are different.

According to the configuration described above, only by visually recognizing display of the display part, a user can recognize which index out of the first index and the second index does not satisfy the criterion.

Preferably, the projection part projects the result image onto the target object.

According to the configuration described above, by visually recognizing a result image projected on the target object, a user can check whether or not the calculated index satisfies the criterion for each area.

Preferably, the image processing system further includes: a projection part configured to project a spatial pattern set in advance on a subject; and an imaging part configured to image the target object. The imaging part generates the first captured image by imaging the target object in a state in which the spatial pattern is projected on the target object. The measurement part detects a pattern appearing in the first captured image and measures a three-dimensional shape of the target object based on a result of the detection. The first index is one of three indexes including an amount of light at the time of the measurement, a collapse of the pattern appearing in the first captured image, and a blurring of the pattern appearing in the first captured image. The second index is another index different from the first index among the three indexes.

According to the configuration described above, a user can determine whether or not the amount of light at the time of measurement, a collapse of the pattern appearing in the first captured image, and a blurring of the pattern appearing in the first captured image satisfy criteria that are respectively set.

Preferably, in a case in which an area not satisfying the first criterion and an area not satisfying the second criterion overlap each other, the reliability evaluation part further estimates whether or not an event set in advance has occurred in the overlapping area based on the measurement result for an area surrounding the overlapping area. The result image further represents an area in which the event set in advance is determined to have occurred.

According to the configuration described above, in a case in which an event set in advance has occurred in the overlapping area, a user can recognize the occurrence of the event.

Preferably, in a case in which an area not satisfying the first criterion and an area not satisfying the second criterion overlap each other, the reliability evaluation part identifies an index having a higher degree of lowering the reliability out of the first index and the second index based on a difference between the first index and the first criterion and a difference between the second index and the second criterion. The display part displays the result image in a form corresponding to the identified index out of the first form and the second form.

According to the configuration described above, in a case in which an area not satisfying the first criterion and an area not satisfying the second criterion overlap each other, a user can recognize a factor (an index) having a higher degree of lowering the reliability in the overlapping area.

According to another aspect of the present disclosure, there is provided an image processing method including: imaging a target object; measuring a three-dimensional shape of the target object based on a captured image acquired by the imaging; calculating an index representing a reliability of measurement of the three-dimensional shape for each area based on the captured image; evaluating whether or not the calculated index satisfies a criterion set in advance for each area; and displaying a measurement result of the three-dimensional shape and a result image representing an area not satisfying the criterion simultaneously or selectively.

According to the method described above, by visually recognizing a result image displayed in the display part, a user can check whether or not a calculated index satisfies the criterion for each area. Therefore, according to the three-dimensional measurement system, acquisition of a measurement result having high reliability can be supported.

Effects

According to the present disclosure, acquisition of a measurement result having high reliability can be supported.

DESCRIPTION OF EMBODIMENTS

Hereinafter, embodiments of the present disclosure will be described with reference to the drawings. In the following description, the same reference signs are assigned to the same components. The names and the functions thereof are the same as well. Thus, detailed description thereof will not be repeated.

§ 1 Application Example

Figure 1:
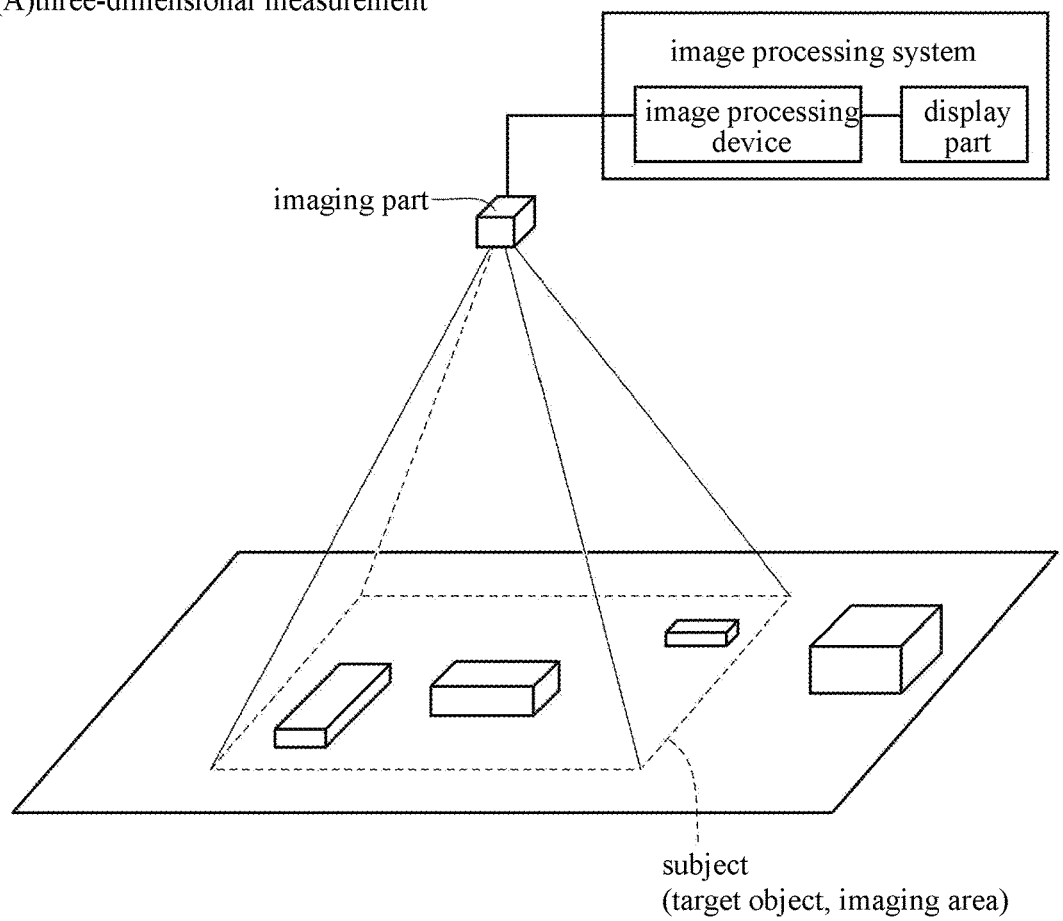
FIG. 1 is a diagram illustrating an overview of a process performed by a three-dimensional measurement system.
Figure 1:
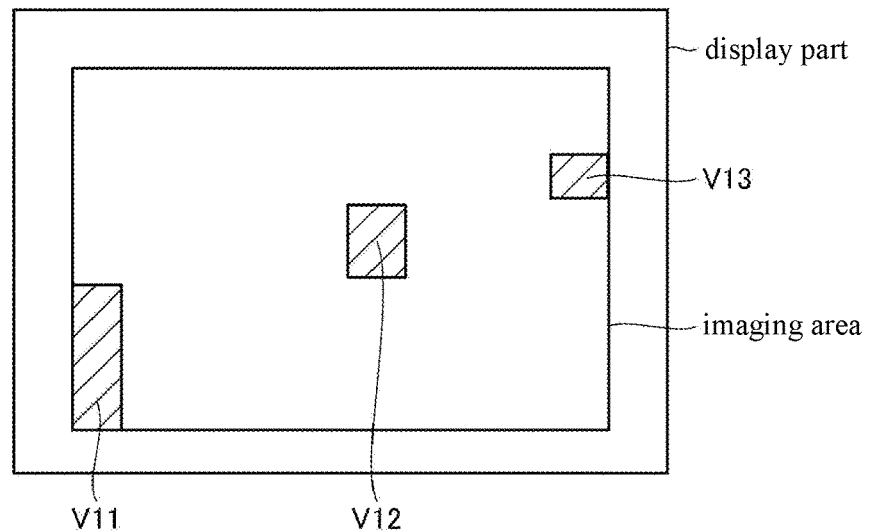

FIG. 1 is a diagram illustrating an overview of a process performed by a three-dimensional measurement system.

Referring to FIG. 1, the three-dimensional measurement system includes an imaging part and an image processing system. The image processing system includes an image processing device and a display part. The image processing device includes a measurement part, a reliability calculation part, and a reliability evaluation part not illustrated in the drawing.

The imaging part images a target object that is a subject as illustrated in state (A). A captured image acquired through imaging using the imaging part is sent to the image processing device.

The measurement part of the image processing device measures a three-dimensional shape of a target object based on a captured image acquired through imaging the target object.

The reliability calculation part calculates an index that represents reliability of the measurement of the three-dimensional shape for each area based on the captured image.

The reliability evaluation part evaluates whether or not an index calculated by the reliability calculation part satisfies a criterion set in advance for each area.

The display part displays a result of measurement of a three-dimensional shape. In addition, as illustrated in state (B), the display part displays an image representing areas V11, V12, and V13 in a captured image that do not satisfy the criterion described above (hereinafter, also referred to as a "result image"). In more details, the display part displays the result of the measurement described above and the result image described above simultaneously or selectively. For example, the display part displays such images in a state in which the result image is superimposed in the result of the measurement.

According to the configuration described above, by visually recognizing a result image displayed in the display part, a user can check whether or not a calculated index satisfies the criterion for each area. Therefore, according to the three-dimensional measurement system of this example, acquisition of a measurement result having high reliability can be supported.

In addition, by changing the installation position of the imaging part, a result image can be acquired at each installation position. Therefore, according to the three-dimensional measurement device of this example, the installation position of the imaging part can be objectively evaluated as well.

§ 2 Configuration Example

Embodiment 1

<A. System Configuration>

Figure 2:
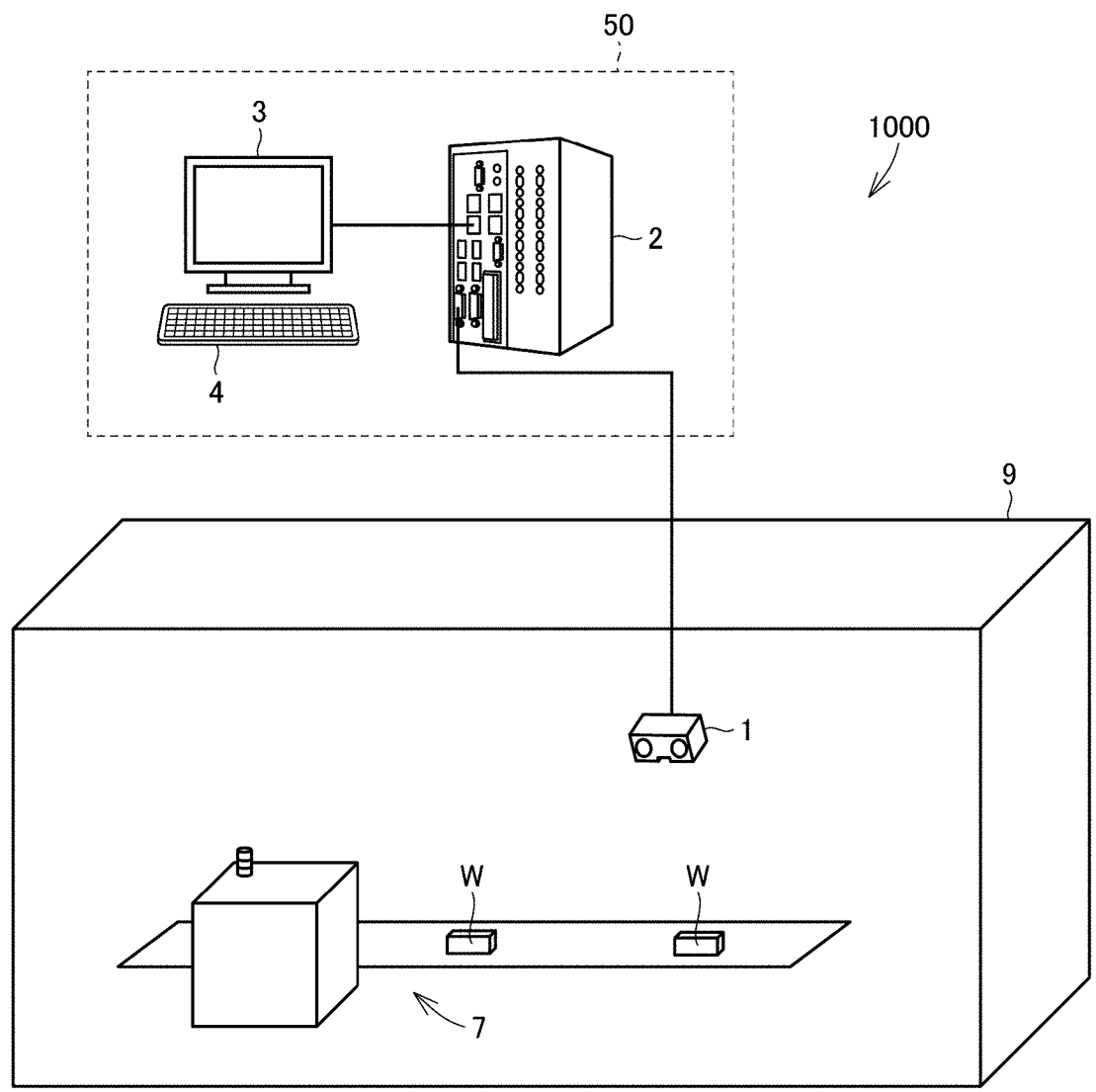
FIG. 2 is a diagram illustrating a schematic configuration of a three-dimensional measurement system.

FIG. 2 is a diagram illustrating a schematic configuration of a three-dimensional measurement system 1000. In this example, a case in which three-dimensional measurement is performed using a space coding method will be described.

Referring to FIG. 2, the three-dimensional measurement system 1000 includes a three dimensions (3D) measurement sensor 1 and an image processing system 50. The image processing system 50 includes an image processing device 2, a display 3, and a keyboard 4. The image processing device 2 is also called a sensor controller or a visual sensor.

The 3D measurement sensor 1 is communicatively connected to the image processing device 2. The image processing device 2 is connected to the display 3. The keyboard 4 is connected to the image processing device 2.

The 3D measurement sensor 1, typically, is installed inside a building 9. The 3D measurement sensor 1 images a target object (subject) such as a facility and the like. In this example, a state in which a work piece W is conveyed on a conveyer is illustrated. By imaging the target object, a captured image including facilities and the work piece W can be acquired.

While details will be described below, the three-dimensional measurement system 1000 performs three-dimensional measurement of a subject using a space coding method.

<B. 3D Sensor>

Figure 3:
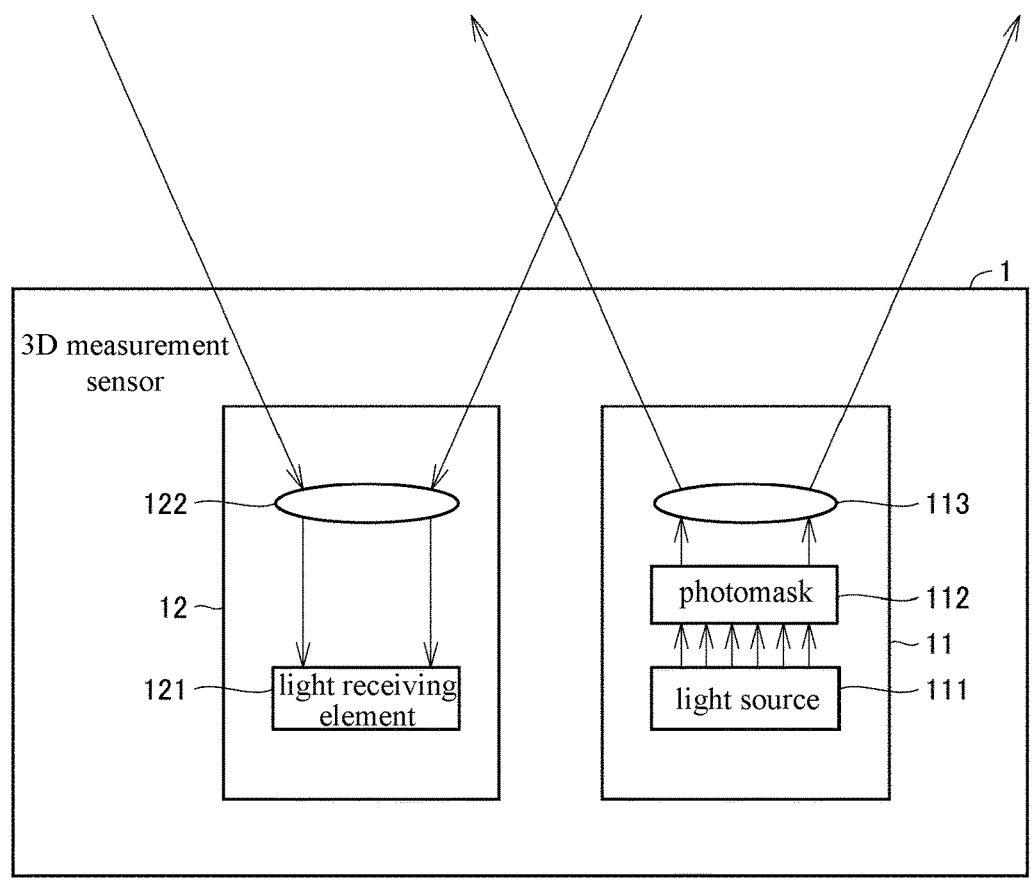
FIG. 3 is a diagram illustrating a schematic configuration of a 3D measurement sensor.

FIG. 3 is a diagram illustrating a schematic configuration of the 3D measurement sensor 1.

Referring to FIG. 3, the 3D measurement sensor 1 includes a projection part 11 and an imaging part 12.

The projection part 11 includes a light source 111, a photomask 112, and an optical system 113. The imaging part 12 includes a light receiving element 121 and an optical system 122.

The light source 111 emits light of a predetermined wavelength in a direction of the photomask 112. A predetermined pattern is formed in the photomask 112. Light that has passed through the photomask 112 is emitted to the outside through the optical system 113. In this way, a spatial pattern is projected into an external space.

The imaging part 12 images a subject in a state in which the spatial pattern is projected thereon. In more details, by receiving light that has passed through the optical system 122 using the light receiving element 121, a captured image can be acquired.

In addition, each of the optical systems 113 and 122 is configured to include one or a plurality of lenses.

<C. Space Coding Method>

Here, the space coding method used in the three-dimensional measurement system 1000 will be described.

c1. Principle

Figure 4:
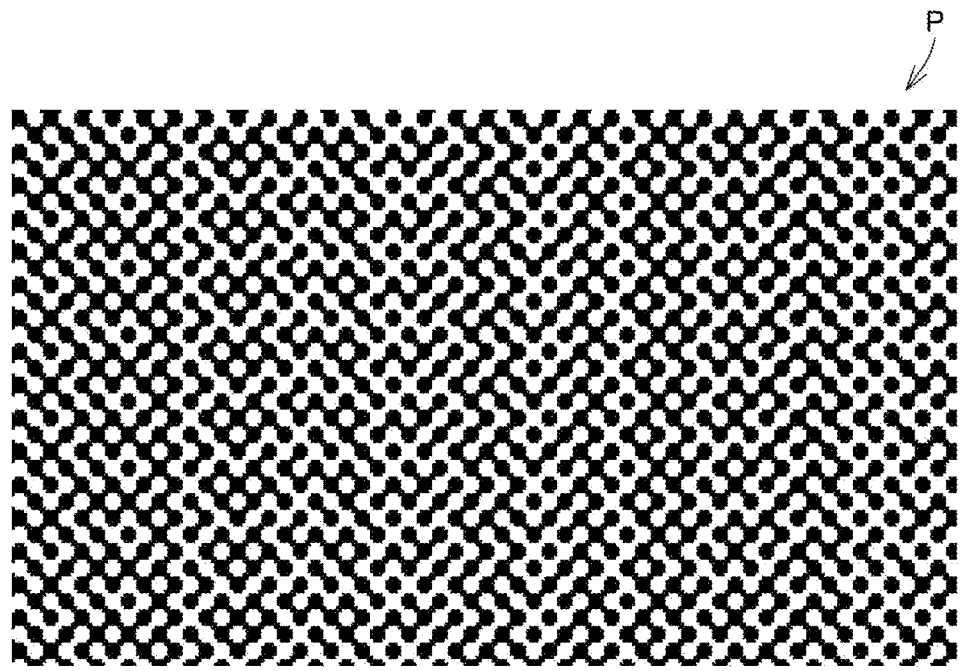
FIG. 4 is a diagram illustrating an example of a spatial pattern.

FIG. 4 is a diagram illustrating an example of a spatial pattern. Referring to FIG. 4, the spatial pattern P is generated by causing light from the light source 111 to pass through the photomask 112.

The spatial pattern P is projected onto a subject. The imaging part 12 images a subject in a state in which the spatial pattern P is projected onto the subject.

Figure 5:
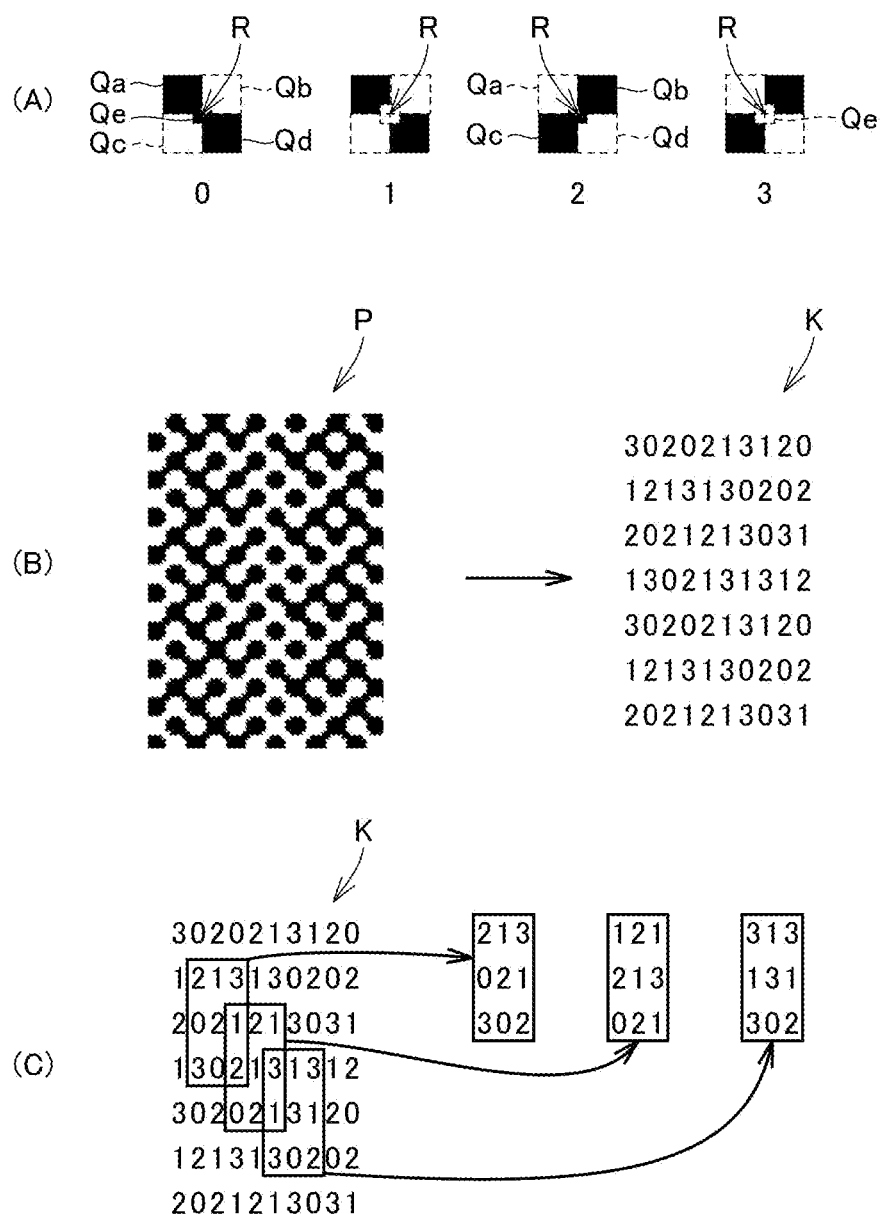
FIG. 5 is a diagram illustrating the principle of measurement in a space coding method.

FIG. 5 is a diagram illustrating the principle of measurement in the space coding method.

The part (A) of FIG. 5 illustrates four types of codes. By using four types of codes, four numerical values of 0 to 3 can be represented.

Referring to the part (A) FIG. 5, each code is composed of four large squares Qa, Qb, Qc, and Qd and one small square Qe positioned at a center part. Each of the squares Qa to Qd is disposed such that a center position R of the code is a corner thereof. The center position R is also a center position of the small square Qe.

The four squares Qa, Qb, Qc, and Qd are called "grid squares". The small square Qe positioned at an intersection of the grid squares is called "primitive". As will be described below, four types of codes are represented by a combination of two types of grid squares and two types of primitive.

When the square Qa positioned on the upper left side is black, a value of a predetermined variable $p_1$ is set to 0 ($p_1=0$). When the square Qa is white, the value of the variable $p_1$ is set to 1 ($p_1=1$).

When a color of the small square Qe positioned at the center is black, a value of a predetermined variable $p_0$ is set to 0 ($p_0=0$). When the color of the square Qe is white, the value of the variable $p_0$ is set to 1 ($p_0=1$). In addition, a sum of $2p_1$ and $p_0$ ($2p_1+p_0$) is set as the value of the code.

For example, in a case in which the square Qa is black, and the square Qe is black, the value of the code is "0". In a case in which the square Qa is black, and the square Qe is white, the value of the code is "1". In a case in which the square Qa is white, and the square Qe is black, the value of the code is "2". In a case in which the square Qa is white, and the square Qe is white, the value of the code is "3".

In this way, four numerical values of "0", "1", "2", and "3" can be represented by four types of codes.

The part (B) of FIG. 5 is a diagram illustrating a matrix that is equivalent to a part of the spatial pattern P (see FIG. 4). Referring to the part (B) of FIG. 5, by representing a type of each code of a projected spatial pattern using a numerical value, a matrix K that is equivalent to a spatial pattern can be generated.

The part (C) of FIG. 5 is a diagram illustrating a partial matrix of the matrix K that is equivalent to the spatial pattern. A partial matrix having a height $H_{word}$ and a width $W_{word}$ for the matrix K will be considered. In addition, such a partial matrix will be also referred to as a "word".

All the words are extracted from the matrix K. In the example illustrated in the drawing, three words that are extracted are illustrated. Each word partially overlaps with other words.

In the case of this example, a height and a width are set to "3". In other words, a case in which a word is set to a 3×3 matrix is illustrated. In this way, in a case in which a word is a 3×3 matrix, $2^9=512$ kinds of words can be represented by one word.

Relating to this point, detailed description will be presented as below. There are four types of code as described above. However, codes represented by one type of primitive are substantially two types. The reason for this is that a grid square is fixed. A grid square substantially represents only the position of a primitive, and code information representing a word is two types of primitive. For this reason, there is information of one bit per one code. Thus, in the case of a word of 3×3, the word represents information of the 9th power of two, in other words, 9 bits, and 512 kinds can be represented by one word.

In the spatial pattern P, codes are arranged such that all the words are respectively unique. In a case in which a word is set as a 3×3 matrix, rows of each word are set not to overlap with each other from among $2^9$ kinds.

When all the words are extracted, for a word of which a row of numerical values is unique, a position (a position of the word) in a spatial pattern can be identified.

Figure 6:
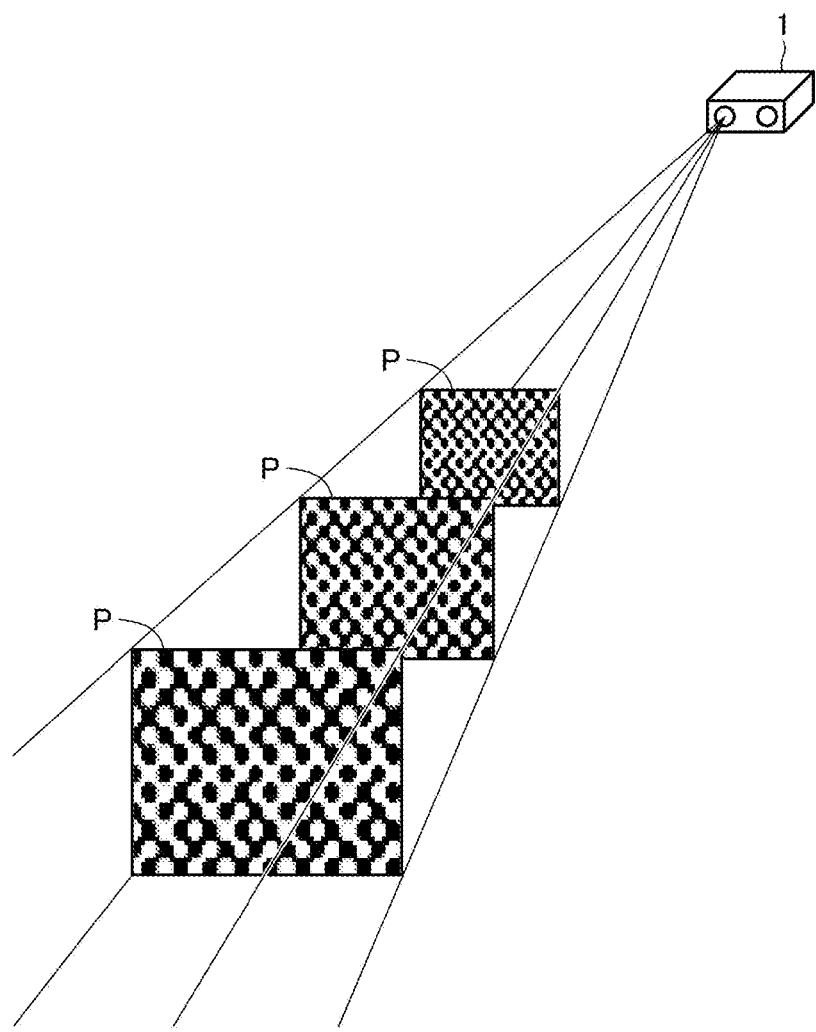
FIG. 6 is a diagram illustrating a size of a spatial pattern at the time of projection.

FIG. 6 is a diagram illustrating sizes of a spatial pattern P at the time of projection. Referring to FIG. 6, in a case in which the spatial pattern P is projected on a subject, a larger code is projected on the subject as the subject becomes farther from the projection part 11. For this reason, in a case in which a subject is imaged in a state in which the spatial pattern P is projected on the subject, a larger code is imaged as the subject becomes farther from the imaging part 12. In the space coding method, a distance from the subject can be measured based on the size of the code acquired through such imaging.

In this way described above, information of a position and a distance can be acquired in the space coding method.

c2. Index of Reliability of Measurement

The image processing device 2 calculates each of a plurality of indexes representing a reliability of measurement of a three-dimensional shape for each area (hereinafter, also referred to as "unit area") of a captured image. The size of each area, typically, is determined in advance based on a resolution of three-dimensional measurement (in other words, a density of codes in a spatial pattern P), a resolution of the light receiving element, and the like. In accordance with a type of index to be described below, the size of the unit area may be set to be different or the same.

In measurement using the space coding method that is performed by the three-dimensional measurement system 1000, for example, there are a plurality of indexes represented in the following (1) to (4) as reliability of the measurement.

(1) Blurring of Pattern

In a case in which a subject (a part of a subject) deviates from a measurement range, a blurring of the pattern occurs. When a blurring of the pattern occurs, the reliability of measurement of a three-dimensional shape is lowered.

By performing a spatial frequency analysis, a blurring state of the pattern can be evaluated. More specifically, when a frequency that is an analysis result becomes high, the blurring can be evaluated to be small. When the frequency becomes low, the blurring can be evaluated to be large. In the spatial frequency analysis, a two-dimensional fast Fourier transform (FFT) or the like can be used.

In this example, the image processing device 2 of the image processing system 50 determines that the blurring is large for an area of which the frequency is lower than a threshold Ta set in advance. In other words, the image processing device 2 determines that the reliability of measurement of the area is low.

In addition, the image processing device 2 determines that the blurring is not large (the blurring is equal to or smaller than that of a normal case) for an area of which the frequency is higher than the threshold Ta. In other words, the image processing device 2 determines that the reliability of measurement of the area is high.

In addition, an area of which reliability of measurement (in other words, measurement stability) is high can be regarded as an area in a "stable state", and an area of which reliability is low can be regarded as an area in an "unstable state".

(2) Amount of Light at Time of Measurement

In a case in which the amount of light at the time of projecting the spatial pattern P is insufficient or in a case in which the amount of light at the time of projecting the spatial pattern P is excessive, reliability of measurement of a three-dimensional shape is lowered.

More specifically, the image processing device 2 determines whether or not the amount of light satisfies a criterion using the following technique.

The image processing device 2 calculates a difference between a luminance value of light received by the light receiving element 121 at the time of projecting the spatial pattern P and a luminance value at the time of not projecting the spatial pattern P for each pixel of the light receiving element 121. The image processing device 2 evaluates whether or not the difference satisfies a criterion set in advance for each pixel.

In more details, the image processing device 2 determines that the amount of light is insufficient for an area of a pixel for which the difference is equal to or smaller than a threshold Tb1. In other words, the image processing device 2 determines that the reliability of measurement of the area is low. In addition, the image processing device 2 determines that the amount of light is excessive for an area of a pixel for which the difference described above is equal to or larger than a threshold Tb2 (Tb2>Tb1). Also in this case, the image processing device 2 determines that the reliability of measurement of the area is low.

Although insufficiency of the amount of light and excessiveness of the amount of light have been described to be determined for each pixel above, it may be determined whether or not the amount of light satisfies a criterion for each area formed by a plurality of continuous pixels.

(3) Collapse of Pattern

As typical examples, there are a case in which a slope (a range of 0 degrees to 90 degrees) of a subject (a part of a subject) with respect to a plane perpendicular to an optical axis of the imaging part 12 is large and a case in which the shape of a subject (a part of a subject) is finer than one word (one word in the projected state) as causes of "pattern collapse". When a pattern collapse occurs due to such causes, the reliability of measurement of a three-dimensional shape is lowered.

(4) Influence of Surrounding Light

The influence of surrounding light can be evaluated from a luminance value of a captured image in a case in which there is no pattern lighting. The image processing device 2 determines that the reliability of measurement is low for an area of which a luminance value exceeds a threshold Tc (for example, 50% of a dynamic range).

D. User Interface d1. Overview

Figure 7:
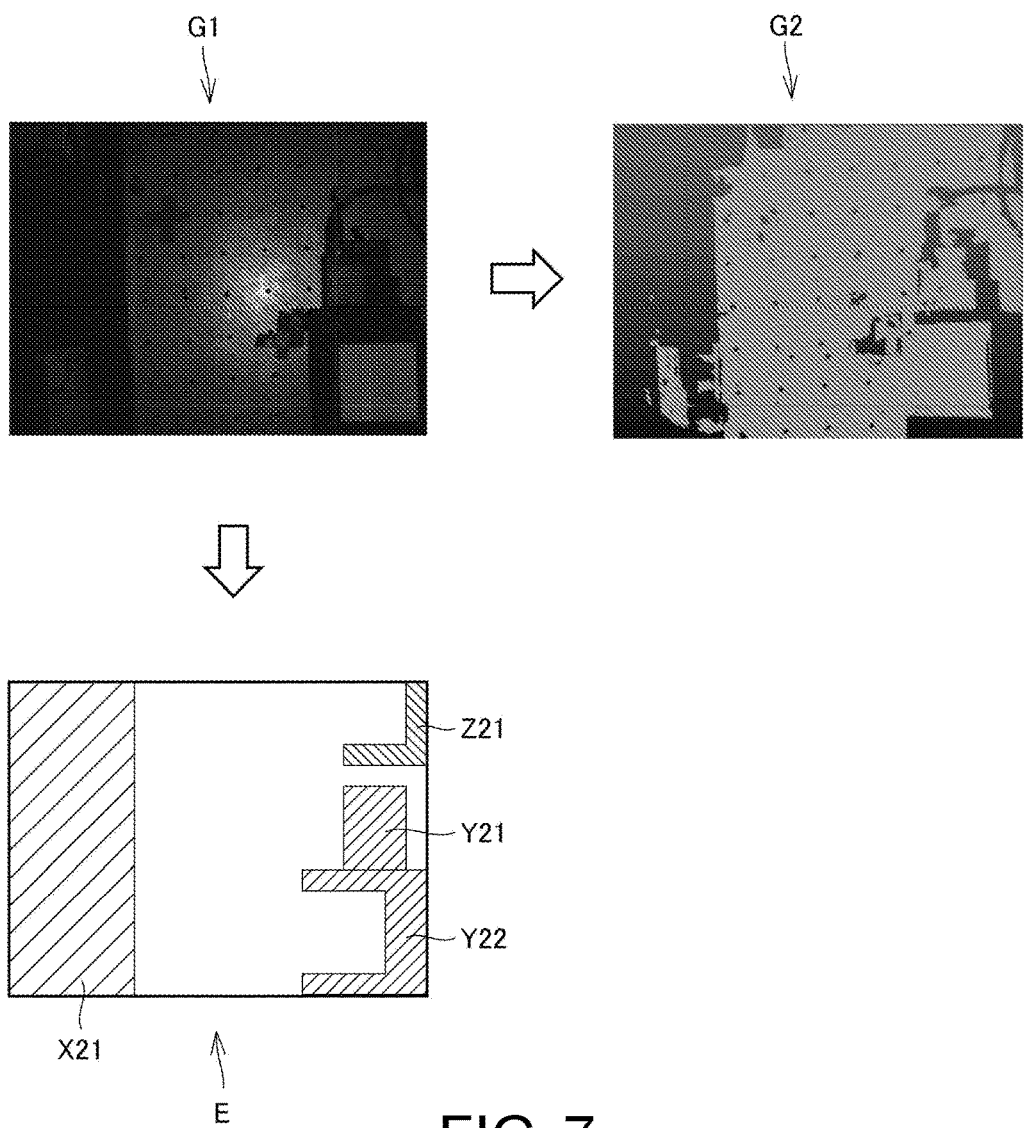
FIG. 7 is a diagram illustrating a process for generating a user interface.

FIG. 7 is a diagram illustrating a process for generating a user interface.

Referring to FIG. 7, the three-dimensional measurement system 1000 images a subject in a state in which a spatial pattern P is projected on a subject using the imaging part 12. Thereafter, the image processing system 50 displays a captured image G1 on the display 3.

The image processing system 50 detects a pattern appearing in a captured image of a subject. The image processing system 50 measures a three-dimensional shape of the subject based on a result of the detection. Typically, when measurement ends, the image processing system 50 displays an image G2 that represents the result of the measurement.

The image processing system 50 causes the display 3 to display an image E representing areas X21, Y21, Y22, and Z21 not satisfying respective indexes (in other words, a result image). In more details, the image processing system 50 displays the image E representing the areas X21, Y21, Y22, and Z21 not satisfying criteria of respective indexes in forms corresponding to indexes (types of index) determined not to satisfy the criteria on the display 3.

For example, in a case in which an index (factor) for which the reliability of the area X21 is determined not to satisfy the criterion is "blurring of a pattern", the image processing system 50 displays the area X21 in a first color (for example, red). In addition, in a case in which an index (factor) for which the reliability of the areas Y21 and Y22 is determined not to satisfy the criterion is "insufficiency of the amount of light", the image processing system 50 displays the areas Y21 and Y22 in a second color (for example, blue). Furthermore, in a case in which an index (factor) for which the reliability of the area Z21 is determined not to satisfy the criterion is "pattern collapse", the image processing system 50 displays the area Z21 in a third color (for example, yellow).

In accordance with this, a user can visually recognize areas not satisfying criteria of indexes with the indexes distinguished from each other.

d2. Specific Example

Hereinafter, typical display examples of areas X21, Y21, Y22, and Z21 of which reliabilities do not satisfy respective criteria will be described.

(1) First Specific Example

Figure 8:
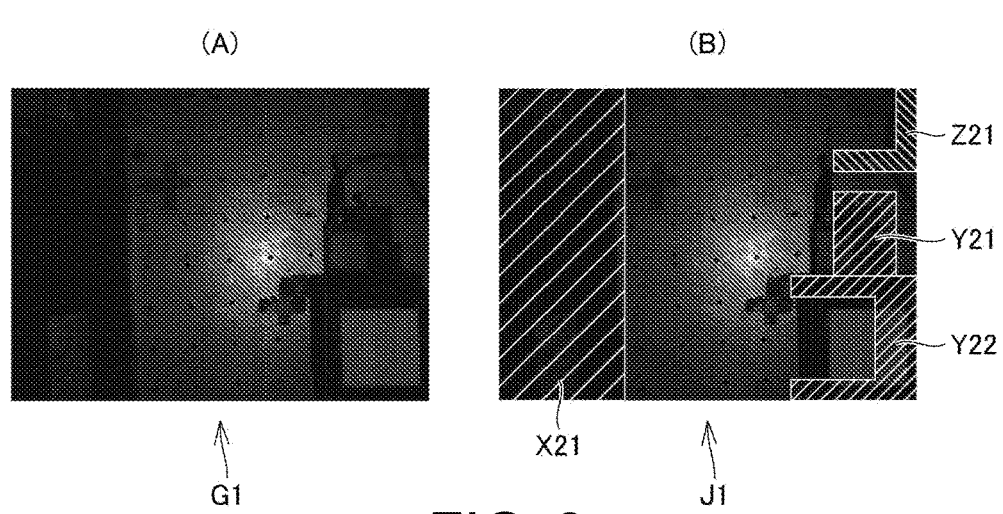
FIG. 8 is a diagram illustrating an example of display.

FIG. 8 is a diagram illustrating an example of display. The part (A) of FIG. 8 is a diagram illustrating a captured image G1 acquired when a subject is imaged in a state in which a spatial pattern P is projected on the subject.

As illustrated in the part (B) of FIG. 8, when an input set in advance (for example, a user instruction) is accepted, the image processing system 50 displays a composed image J1, which is in a state in which the result image E is superimposed on the captured image G1, on the display 3. Typically, the image processing system 50 displays an image representing the areas X21, Y21, Y22, and Z21, for example, using figures representing ranges such as rectangles and the like. In more details, the image processing system 50 displays the areas X21, Y21, Y22, and Z21 of the captured image G1 in forms corresponding to indexes determined not to satisfy respective criteria.

(2) Second Specific Example

Figure 9:
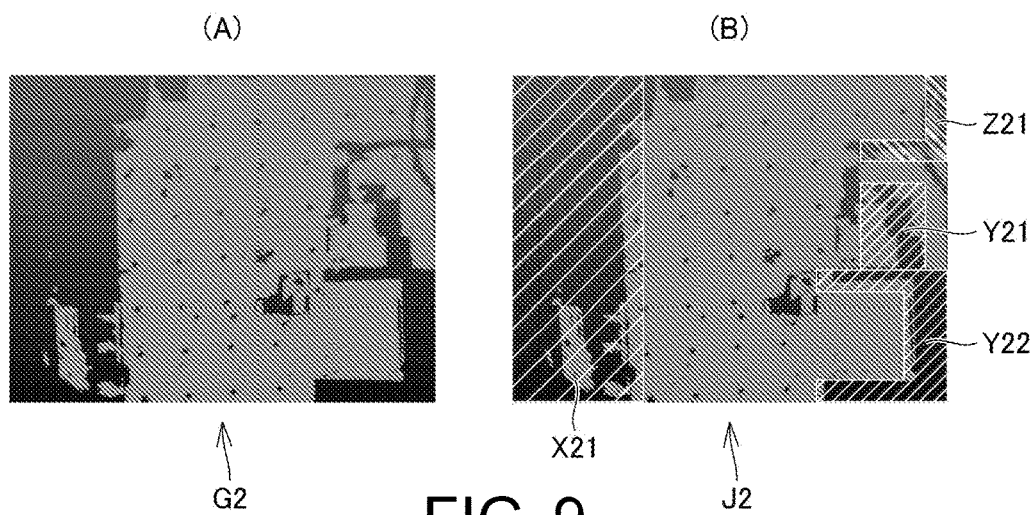
FIG. 9 is a diagram illustrating another example of display.

FIG. 9 is a diagram illustrating another example of display. The part (A) of FIG. 9 is a diagram illustrating an image G2 that represents a measurement result.

As illustrated in the part (B) of FIG. 9, when an input set in advance (for example, a user instruction) is accepted, the image processing system 50 displays a composed image J2, which is in a state in which the result image E is superimposed on the image G2 representing the measurement result, on the display 3. Typically, similar to FIG. 8(B), the image processing system 50 displays an image representing the areas X21, Y21, Y22, and Z21, for example, using figures representing ranges such as rectangles and the like in forms corresponding to indexes determined not to satisfy respective criteria.

(3) Third Specific Example

Figure 10:
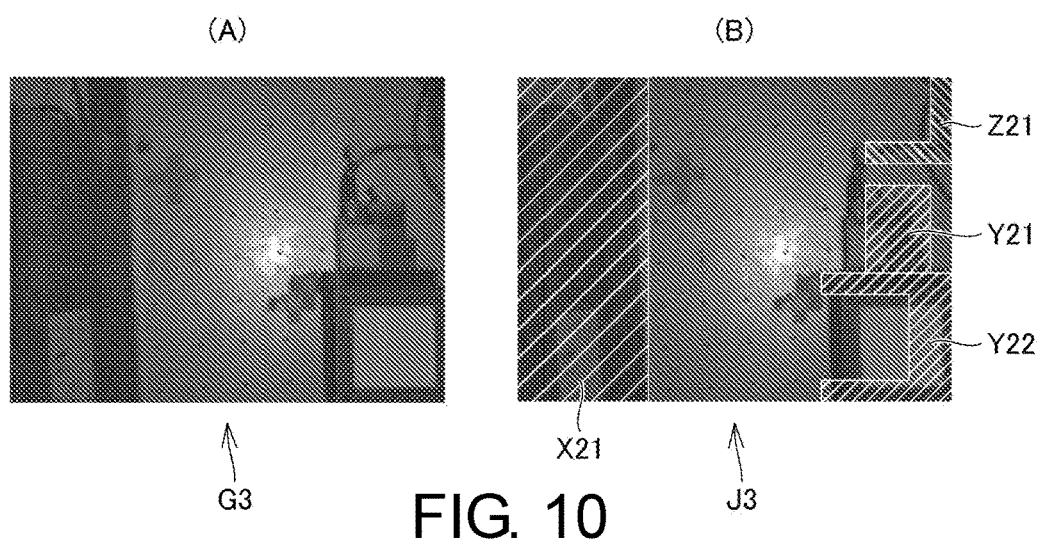
FIG. 10 is a diagram illustrating yet another example of display.

FIG. 10 is a diagram illustrating yet another example of display.

The three-dimensional measurement system 1000 further images the subject using the imaging part 12 in a state in which the spatial pattern P is not projected. The part (A) of FIG. 10 is a diagram illustrating a captured image G3 acquired when the subject is imaged in a state in which the spatial pattern P is not projected onto the subject.

As illustrated in the part (B) of FIG. 10, when an input set in advance (for example, a user instruction) is accepted, the image processing system 50 displays a composed image J3, which is in a state in which the result image E is superimposed onto the captured image G3, on the display 3. Typically, similar to the part (B) of FIG. 8, the image processing system 50 displays an image representing the areas X21, Y21, Y22, and Z21, for example, using figures representing ranges such as rectangles and the like in forms corresponding to indexes determined not to satisfy respective criteria.

(4) Summary

In this way, the image processing system 50 calculates a plurality of indexes respectively representing a reliability of measurement of a three-dimensional shape for each area based on a captured image of the target object. The image processing system 50 evaluates whether or not each calculated index satisfies the criterion of each index for each area. The image processing system 50 causes the display 3 to display the measurement result (image G2) having a three-dimensional shape and the result image E representing an area not satisfying each criterion in a captured image simultaneously or selectively.

Thus, when a user visually recognizes the result image E (typically, the composed images J1, J2, and J3 on which the result image E is superimposed), the user can intuitively recognize whether or not a calculated index satisfies a criterion for each area. Thus, according to the three-dimensional measurement system 1000, acquisition of a measurement result having high reliability can be supported.

By changing the installation position of the 3D measurement sensor 1, a result image E can be acquired at each installation position. Thus, according to the three-dimensional measurement system 1000, the installation position of the 3D measurement sensor 1 can be objectively evaluated.

In addition, the image processing system 50 displays an area determined not to satisfy the criterion in a form corresponding to an index determined not to satisfy the criterion. Thus, a user can recognize an index of which a criterion is not satisfied for an area for which the reliability is determined not to satisfy the criterion. In other words, the user can recognize a problem that causes a state in which the reliability is low.

Hereinafter, for the convenience of description, a captured image (for example, the captured image G1) that can be acquired when a subject is imaged in a state in which the spatial pattern P is projected onto the subject will be also referred to as a "measured image". In addition, a captured image (for example, the captured image G3) that can be acquired when a subject is imaged in a state in which the spatial pattern P is not projected onto the subject will be also referred to as a "2D image".

(5) Modified Example

Figure 11:
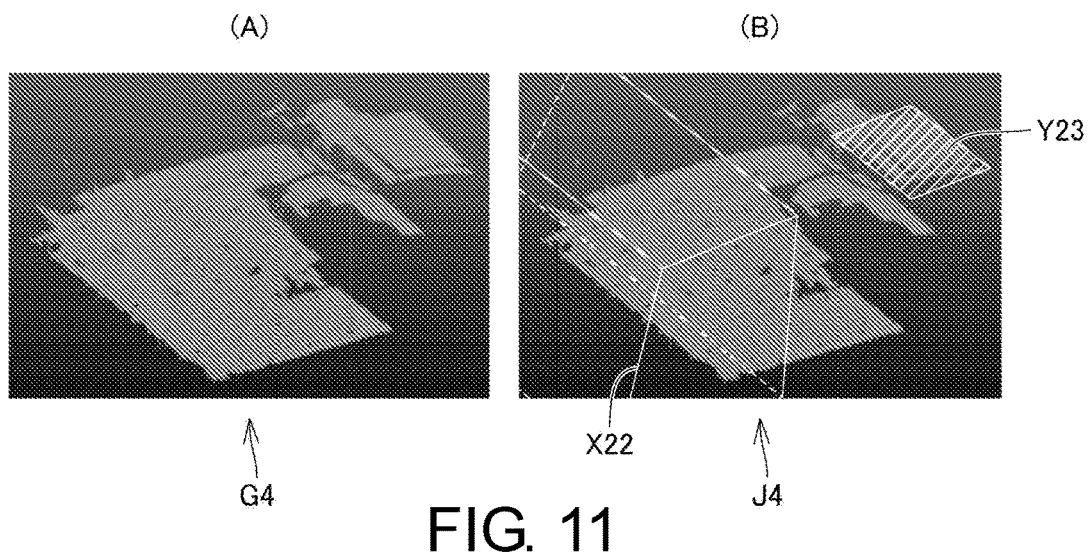
FIG. 11 is a diagram illustrating a modified example of a second specific example.

FIG. 11 is a diagram illustrating a modified example of the second specific example.

The three-dimensional measurement system 1000 has a function of changing a viewpoint for a measurement result and can display an image after change on the display 3. For example, as illustrated in the part (A) FIG. 11, the three-dimensional measurement system 1000, for example, displays an image G4 on the display 3 by changing the viewpoint from a viewpoint at the time of the image G2 (a viewpoint serving as a reference) representing a measurement result to a viewpoint in a diagonal view direction with respect to the subject.

As illustrated in the part (B) of FIG. 11, when an input set in advance (for example, a user instruction) is accepted, the image processing system 50 displays a composed image J4, which is in a state in which a result image E' (not illustrated as a single body) is superimposed onto the image G4 representing a measurement result, on the display 3. Typically, the image processing system 50 displays an image representing areas X22 and Y23, for example, using figures representing ranges such as rectangles and the like in a form corresponding to an index determined not to satisfy the criterion.

In this example, an index (factor) for which the reliability of the area X22 is determined not to satisfy the criterion is assumed to be "blurring of a pattern". In addition, an index (factor) for which the reliability of the area Y23 is determined not to satisfy the criterion is assumed to be "insufficiency of the amount of light".

In this case, in order to display also an area of a measurement range (a range in an imaging distance direction of the 3D measurement sensor 1), the image processing system 50 displays the area X22 using a stereoscopic figure (for example, a frustum). In this way, when the image in the diagonal view direction like the image J4 is displayed, in a case in which blurring of a pattern (deviating from the measurement range) does not satisfy a criterion, information of the measurement range can be embedded in the image in the diagonal view direction using a figure.

A user can easily determine the installation position of the 3D measurement sensor 1 by checking such information of the measurement range.

E. Functional Configuration

Figure 12:
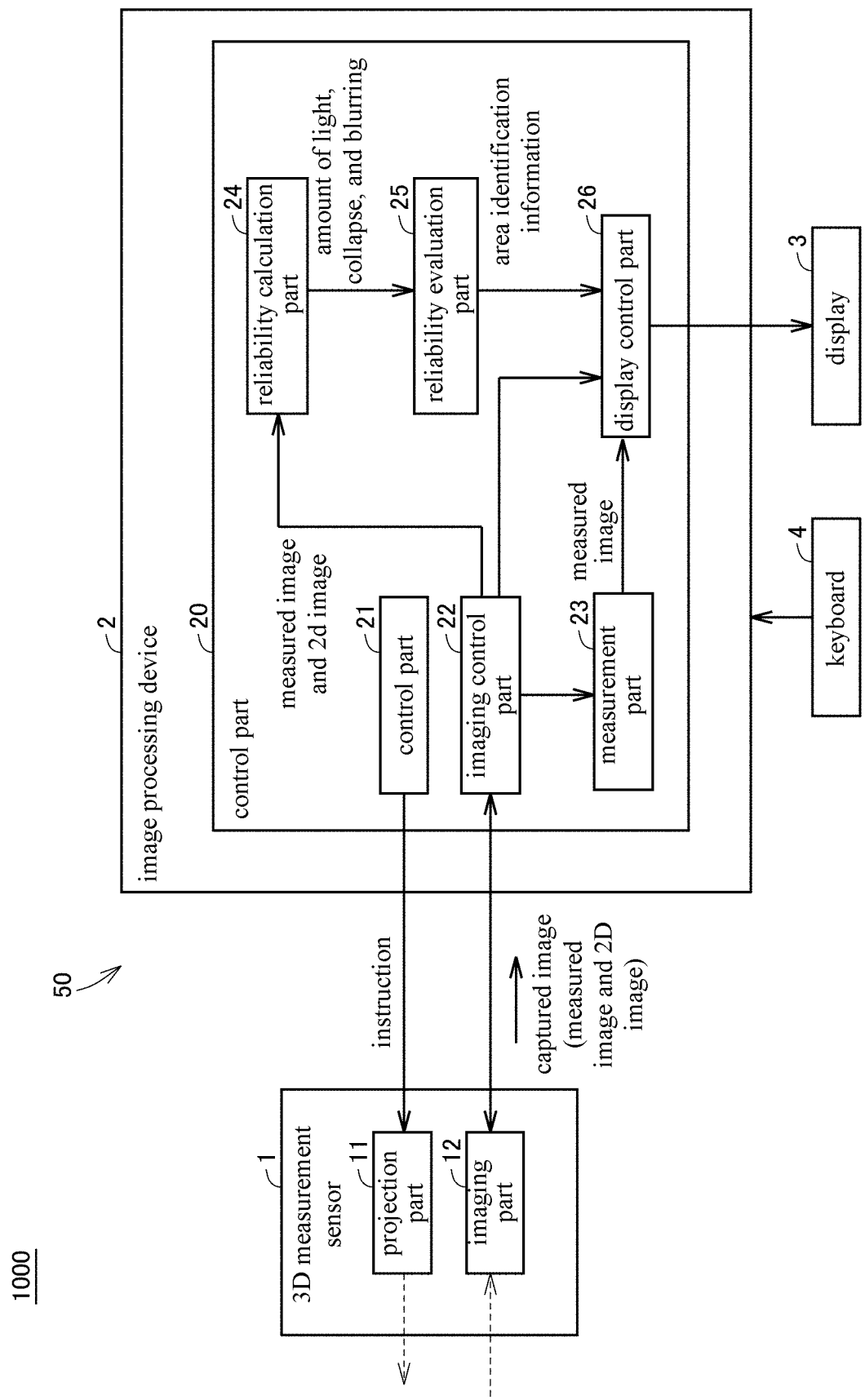
FIG. 12 is a block diagram illustrating a functional configuration of a three-dimensional measurement system.

FIG. 12 is a block diagram illustrating the functional configuration of the three-dimensional measurement system 1000.

Referring to FIG. 12, the three-dimensional measurement system 1000, as described above, includes a 3D measurement sensor 1, an image processing device 2, a display 3, and a keyboard 4. The image processing system 50 includes an image processing device 2, a display 3, and a keyboard 4.

The 3D measurement sensor 1, as described above, includes a projection part 11 and an imaging part 12 (see FIG. 3).

The image processing device 2 includes a control part 20. The control part 20 includes a projection control part 21, an imaging control part 22, a measurement part 23, a reliability calculation part 24, a reliability evaluation part 25, and a display control part 26.

The control part 20 controls an overall operation of the image processing device 2. The control part 20 accepts an input from the keyboard 4. The control part 20 executes an operation corresponding to the input. For example, the control part 20 controls an operation of the 3D measurement sensor 1 and an output to the display 3. In addition, in a case in which an input from the keyboard is for a change of a viewpoint of an image that represents a measurement result, the control part 20 performs image display corresponding to the input on the display 3.

Each process in the control part 20, typically, is realized by a processor (not illustrated in the drawing) of the image processing device 2 executing a program stored in a memory (not illustrated in the drawing) of the image processing device 2 in advance.

The projection control part 21 controls an operation of the projection part 11. For example, the projection control part 21 controls on/off of the light source 111.

The imaging control part 22 controls an operation of the imaging part 12. For example, the imaging control part 22 sends an instruction for imaging to the imaging part 12 and acquires a captured image from the imaging part 12. As captured images, there are an image that is acquired through imaging at the time of three-dimensional measurement (imaging in a 3D mode) (in other words, a measured image) and an image that is acquired at the time of normal imaging (imaging in a 2D mode) in which three-dimensional measurement is not performed (2D image).

The imaging control part 22 sends the measured image to the measurement part 23. The imaging control part 22 sends the measured image and the 2D image to the reliability calculation part 24 and the display control part 26.

The measurement part 23 measures a three-dimensional shape of a subject (target object) based on a captured image acquired by imaging the subject. In more details, the measurement part 23 detects a pattern appearing in a captured image of a subject and measures a three-dimensional shape of the subject based on a result of the detection. The measurement part 23 sends a measurement result to the display control part 26.

The reliability calculation part 24 calculates an index representing a reliability of measurement of the three-dimensional shape for each area based on the captured image. Typically, the reliability calculation part 24 calculates a plurality of indexes. For example, as the indexes, as described above, there are "blurring of a pattern", "the amount of light at the time of measurement", "collapse of a pattern", "influence of surrounding light", and the like. The reliability calculation part 24 sends the calculated indexes to the reliability evaluation part 25.

The reliability evaluation part 25 evaluates whether or not various calculated indexes satisfy criteria, which are set in advance for the indexes, for each area described above. For example, the reliability evaluation part 25 determines whether or not a calculated blurring of the pattern satisfies a criterion set in advance to the blurring. In addition, the reliability evaluation part 25 determines whether or not the calculated amount of light at the time of measurement satisfies a criterion set in advance to the amount of light. Furthermore, it is determined whether or not "collapse of a pattern" and "influence of surrounding light" satisfy predetermined criteria. In addition, the reliability evaluation part 25 stores the criteria (more specifically, thresholds) in advance.

Furthermore, the reliability evaluation part 25 notifies the display control part 26 of area identification information representing areas not satisfying criteria in relation to each index. More specifically, the reliability evaluation part 25 notifies the display control part 26 of an area for which the blurring of the pattern does not satisfy a criterion, an area for which the amount of light does not satisfy a criterion, an area for which the collapse of the pattern does not satisfy a criterion, and an area for which the influence of surrounding light do not satisfy a criterion in the state being identifiable for each index.

The display control part 26 receives a measurement result from the measurement part 23. The display control part 26 receives a measured image and a 2D image from the imaging control part 22. The display control part 26 receives area identification information of each index from the reliability evaluation part 25.

The display control part 26 displays a designated image out of the measured image and the 2D image on the display 3 as a result of the measurement. The designation, typically, is performed in accordance with a user operation using an input device such as a keyboard or the like.

In addition, the display control part 26 displays a result image representing the areas not satisfying the criteria described above on the display 3. The areas not satisfying respective criteria are illustrated in the result image in the form of being identifiable for each index.

For example, the display control part 26 displays an area for which the criterion of "blurring of the pattern" is not satisfied in red as a result image. The display control part 26 displays an area for which the criterion of "the amount of light at the time of measurement" is not satisfied in blue. The display control part 26 displays an area for which the criterion of "collapse of the pattern" is not satisfied in yellow. The display control part 26 displays an area for which the criterion of "influence of surrounding light in green.

The display control part 26 displays at least the measurement result and the result image simultaneously or selectively.

In a certain aspect, the display control part 26 displays the result image in the state of being superimposed on the captured image (in more details, the measured image) on the display 3 (see the part (B) of FIG. 8). In another aspect, the display control part 26 displays the result image in the state of being superimposed on the measurement result on the display 3 (see the part (B) of FIG. 9). In a further another aspect, the display control part 26 displays the result image in the state of being superimposed on the 2D image on the display 3 on the display 3 (see the part (B) of FIG. 10). In the three-dimensional measurement system 1000, an image on which the result image is to be superimposed and displayed can be determined by a user in accordance with the user performing a display screen switching operation.

F. Control Structure

Figure 13:
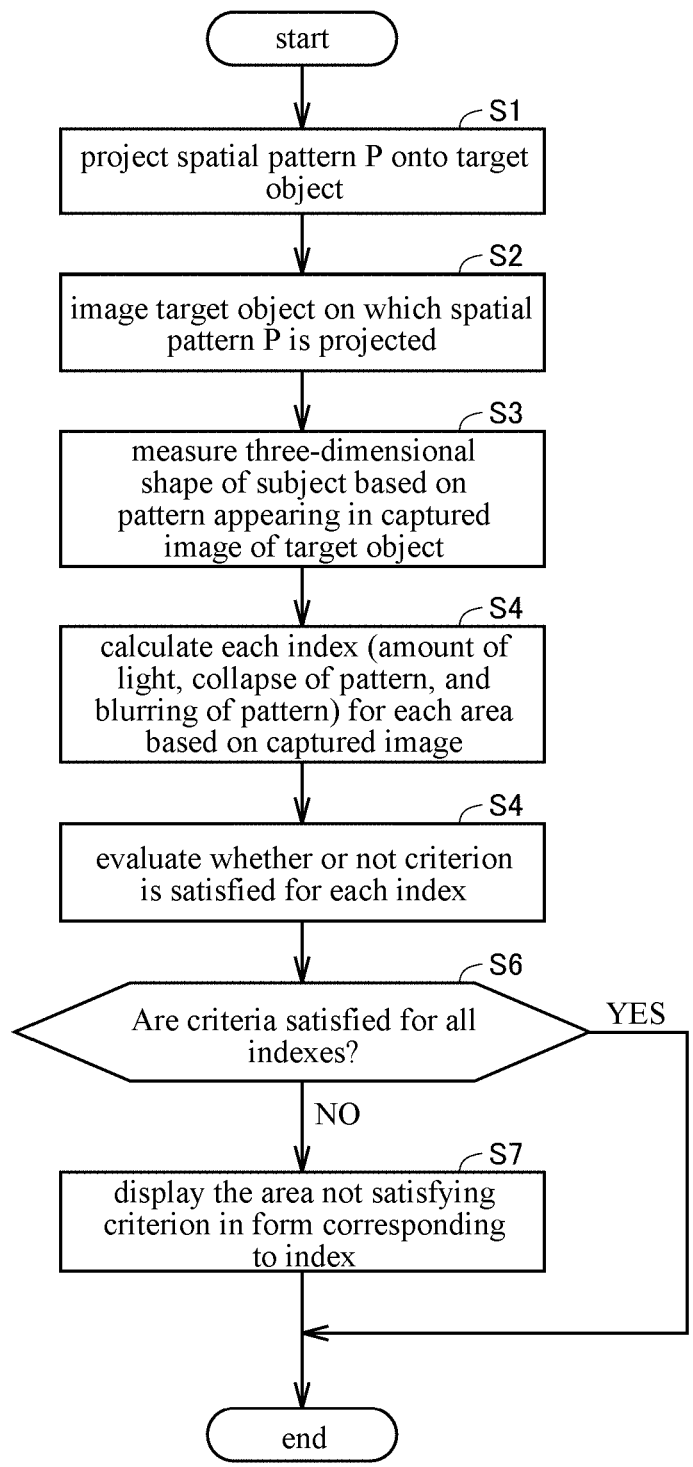
FIG. 13 is a flowchart illustrating the flow of a process executed by a three-dimensional measurement system.

FIG. 13 is a flowchart illustrating the flow of a process executed by the three-dimensional measurement system 1000.

Referring to FIG. 13, the three-dimensional measurement system 1000 projects the spatial pattern P on a subject using the 3D measurement sensor 1 in Step S1. The three-dimensional measurement system 1000 images the subject in a state in which the spatial pattern P is projected thereon using the 3D measurement sensor 1 in Step S2.

The image processing device 2 of the three-dimensional measurement system 1000 measures a three-dimensional shape of the subject based on a pattern appearing in the captured image of the subject in Step S3. The image processing device 2 calculates indexes (blurring of the pattern, the amount of light at the time of measurement, a collapse of the pattern, and the like) based on the captured image for each area in Step S4.

The image processing device 2 evaluates whether or not a criterion, which is set to each index, is satisfied for each index in Step S5. The image processing device 2 determines whether or not criteria are satisfied for all the indexes in Step S6. In a case in which it is determined that the criteria are satisfied for all the indexes (YES in Step S6), the image processing device 2 ends a series of processes. In this case, for example, the image processing device 2 displays the measurement result on the display 3.

In a case in which it is determined that the criterion is not satisfied for at least one index (NO in Step S6), the image processing device 2 displays areas not satisfying criteria in forms corresponding to the indexes (for example, red, blue, and yellow) on the display 3 in Step S7.

G. Modified Example g1. Display Form Corresponding to Index

In the description presented above, although an example in which three-dimensional measurement system 1000 displays areas determined not to satisfy criteria in colors (for example, red, blue, and yellow) corresponding to indexes determined not to satisfy the criteria has been described, the display form is not limited thereto.

The three-dimensional measurement system 1000 may display areas determined not to satisfy criteria in hatching patterns corresponding to indexes determined not to satisfy the criteria. Alternatively, the three-dimensional measurement system 1000 may display areas determined not to satisfy criteria in blinking patterns corresponding to indexes determined not to satisfy the criteria.

The three-dimensional measurement system 1000 may be configured such that display forms of areas of which a three-dimensional shape cannot be measured can be selected by a user.

g2. Case in which Plurality of Times of Imaging is Executed

A display example in a case in which a subject is imaged a plurality of times in a state in which a spatial pattern P is projected on the subject will be described. In addition, also in each example described below, the three-dimensional measurement system 1000 causes the display to display a result image (for example, the result image E illustrated in FIG. 7) in forms corresponding to indexes (types of indexes) determined not to satisfy criteria.

(1) First Example

When one of a plurality of captured images (in other words, a plurality of measured images) acquired through imaging of a plurality of times is designated, the three-dimensional measurement system 1000 displays a result image, which is acquired by the captured image, in the state of being superimposed on the designated captured image. In addition, for example, the designation is performed using an input device such as the keyboard 4, a mouse not illustrated in the drawing, or the like.

In the case of such a configuration, the three-dimensional measurement system 1000 can superimpose a result image on the designated one captured image even in a case in which a plurality of captured images are acquired. Also in such a case, a user can check whether or not each of the calculated indexes satisfies each criterion for each area by visually recognizing the result image displayed in a display part of the display 3.

In addition, the imaging of the plurality of times may be imaging that is performed at mutually-different positions. In other words, the plurality of captured images may be acquired by repeating movement of the installation position of the 3D measurement sensor 1 and imaging. In such a case, a user can evaluate a suitability of each installation position of the 3D measurement sensor 1 by appropriately changing the designated captured image.

In addition, also in the case of such a configuration, a result image may be displayed with being superimposed on an image representing a measurement result or a 2D image.

(2) Second Example

In a case in which imaging of a subject is performed a plurality of times, the three-dimensional measurement system 1000 displays a plurality of result images in a state in which a result image acquired by a captured image is superimposed on each of a plurality of captured images (in other words, a plurality of measured images) acquired through the imaging of the plurality of times.

Figure 14:
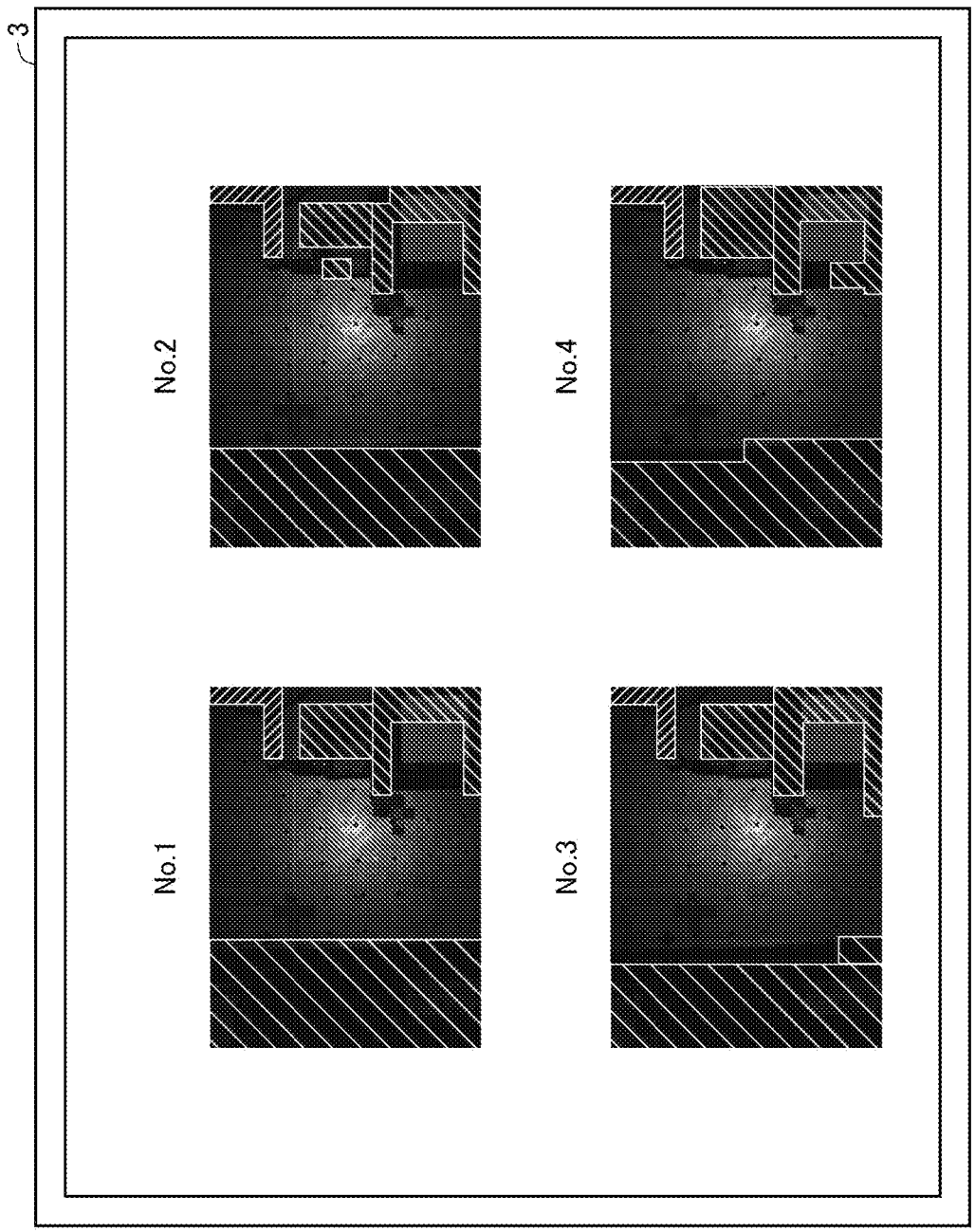
FIG. 14 is a diagram illustrating an example of display in a case in which imaging of a subject is performed a plurality of times.

FIG. 14 is a diagram illustrating an example of display in a case in which imaging of a subject is performed a plurality of times. Referring to FIG. 14, the three-dimensional measurement system 1000 displays a plurality of result images in a state in which, on each of the captured images (measured images No. 1 to No. 4), a result image acquired using the captured image is superimposed.

In this way, the three-dimensional measurement system 1000 performs display by superimposing a result image on each of a plurality of captured images. Thus, a user can check whether or not each index calculated in measurement of each time satisfies a criterion for each area on one screen.

In addition, the imaging of a plurality of times described above may be imaging performed at mutually-different positions. In other words, the plurality of captured images described above may be acquired by repeating movement of the installation position of the 3D measurement sensor 1 and imaging. In such a case, a user can evaluate the suitability of each installation position of the 3D measurement sensor 1 without designating a captured image.

(3) Third Example

The three-dimensional measurement system 1000 may display the image illustrated in the part (B) of FIG. 8, the image illustrated in the part (B) of FIG. 9, and the image illustrated in the part (B) of FIG. 10 within one screen at the same time.

g3. Estimation or Identifying Process

An example of a process in a case in which at least two of a plurality of indexes do not satisfy criteria associated with the indexes in a certain area will be described. As such a case, for example, there is a case in which an area for which a blurring of the pattern is larger than a criterion and an area for which the amount of light at the time of measurement is smaller than a criterion overlap each other (parts of areas or the entire areas overlap each other). Hereinafter, for the convenience of description, such an area will be also referred to as an "overlapping area".

(1) First Example

The reliability evaluation part 25 further estimates whether or not an event set in advance has occurred in the overlapping area based on a result of measurement of an area surrounding the overlapping area. The display control part 26 displays an area in which the event set in advance is determined to have occurred with included in the result image on the display 3. In addition, it is preferable to display the area in a color that is further different from the colors (red, blue, yellow, and the like) corresponding to the indexes described above.

As an example of the event set in advance, there is multiple reflection. When light is reflected on a work piece W twice, a phenomenon of a blurring of the pattern and a phenomenon of an excess (halation) of the amount of light occur. When an evaluation is performed using both indexes of the blurring of the pattern and the amount of light, an evaluation indicating that each of the indexes does not satisfy the criterion is acquired. However, the essential cause is not the blurring and the excess in the amount of light but multiple reflection.

For this reason, in a case in which a result of measurement of the area surrounding the overlapping area represents an abnormal deviation value or there is no result or in a case in which there is a result of measurement having a strong inclination, the reliability evaluation part 25 evaluates that multiple reflection has occurred.

In this way, the image processing device 2 determines whether or not an event set in advance has occurred based on information of the periphery of the overlapping area. In addition, the image processing device 2 displays the overlapping area on the display 3, and thus a user can recognize an occurrence of the event.

(2) Second Example

In a case in which there is an overlapping area, the reliability evaluation part 25 calculates a difference from the criterion for each of a plurality of indexes not satisfying the criterion in the overlapping area. For example, in the overlapping area, it is assumed that the blurring of the pattern is larger than a corresponding criterion, and the amount of light at the time of measurement is smaller than a corresponding criterion. In this case, the reliability evaluation part 25 calculates a difference between a blurring of the pattern and a criterion of the blurring and a difference between the amount of light at the time of measurement and a criterion of the amount of light.

The reliability evaluation part 25 identifies an index having a higher degree of lowering the reliability among a plurality of indexes not satisfying respective criteria based on a plurality of differences thereof.

The display control part 26 displays a result image in a form corresponding to the identified index. In a case in which the reliability evaluation part 25 determines that the blurring of the pattern decreases the reliability more than the amount of light, the display control part 26 displays the overlapping area in a form (for example, red) associated with the blurring on the display 3.

Embodiment 2

A three-dimensional measurement system according to this embodiment will be described. Hereinafter, points that are different from Embodiment 1 will be focused on in description.

In Embodiment 1, a configuration in which images are displayed in a state in which a result image representing an area not satisfying a criterion for each index is superimposed on an image representing a measurement result has been described. In this embodiment, a configuration in which the result image is projected on a subject by a projection part 11 will be described.

Figure 15:
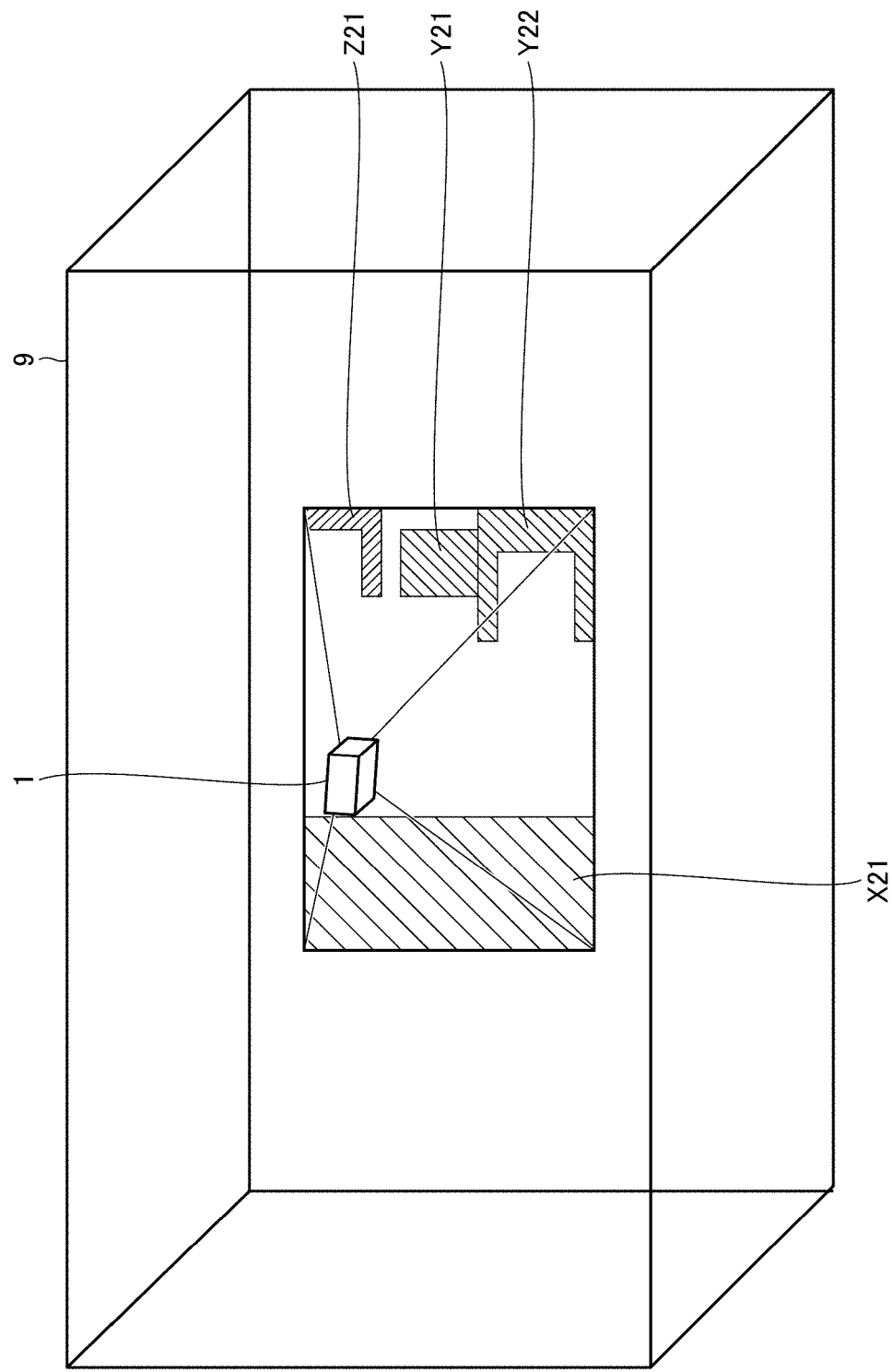
FIG. 15 is a diagram illustrating a state in which a result image is projected onto a subject.

FIG. 15 is a diagram illustrating a state in which a result image is projected on a subject. Indoor facilities 7 and the like of a building 9 are not illustrated in FIG. 15.

In this way, by directly projecting a result image representing areas X21, Y21, Y22, and Z21 not satisfying respective criteria on a subject, a user can recognize the presence and the position of the area with reality. In addition, by projecting the areas X21, Y21, Y22, and Z21 onto the subject in forms corresponding to indexes (types of indexes) determined not to satisfy respective criteria, a user can recognize an index of which a criterion is not satisfied for each of the areas X21, Y21, Y22, and Z21 for which the reliability is determined not to satisfy the criterion.

Figure 16:
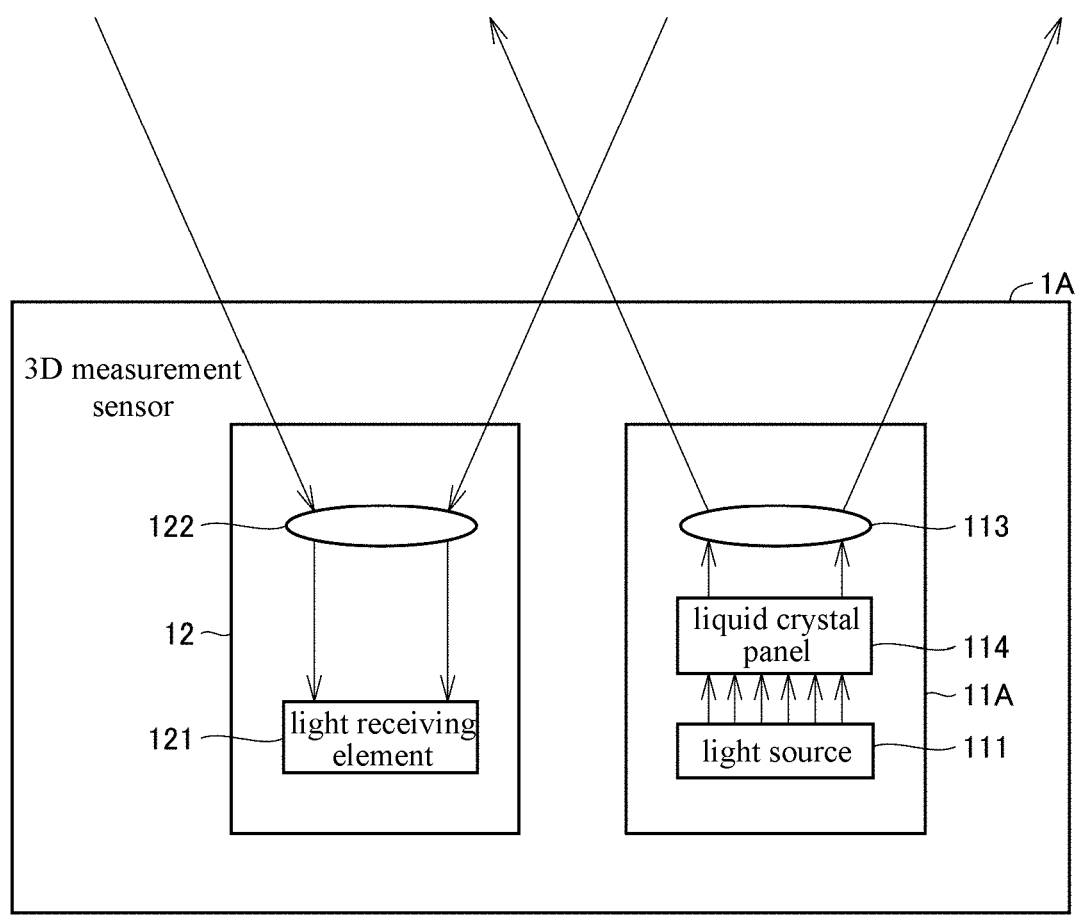
FIG. 16 is a diagram illustrating a schematic configuration of a 3D measurement sensor of a three-dimensional measurement system according to another embodiment.

FIG. 16 is a diagram illustrating a schematic configuration of a 3D measurement sensor 1A of the three-dimensional measurement system 1000 according to this embodiment.

Referring to FIG. 16, the 3D measurement sensor 1A includes a projection part 11A and an imaging part 12.

The projection part 11A includes a light source 111, a liquid crystal panel 114, and an optical system 113. The projection part 11A is different from the projection part 11 according to Embodiment 1 in that the liquid crystal panel 114 is included instead of the photomask 112.

The light source 111 emits light of a predetermined wavelength in the direction of the liquid crystal panel 114. The liquid crystal panel 114 is driven in accordance with an instruction from the image processing device 2.

In a certain aspect, the liquid crystal panel 114 displays a spatial pattern P. In accordance with this, the projection part 11A can project the spatial pattern onto the subject.

In addition, in another aspect, the liquid crystal panel 114 displays a result image, whereby the projection part 11A can project the result image onto the subject.

In this way, by performing switching between images displayed on the liquid crystal panel 114, projection of the spatial pattern P and projection of the result image can be performed.

In each embodiment described above, although a case in which three-dimensional measurement is performed using the space coding method has been described, a phase shift method, a stereo method, or a pattern lighting method may be used instead of the space coding method.

<Supplementary Note>

[Configuration 1]

An image processing system (50) including: a measurement part (23) configured to measure a three-dimensional shape of a target object based on a first captured image acquired by imaging the target object; a reliability calculation part (24) configured to calculate a first index representing a reliability of measurement of the three-dimensional shape for each area based on the first captured image; a reliability evaluation part (25) configured to evaluate whether or not the calculated first index satisfies a first criterion set in advance for each area; and a display part (3) configured to display a measurement result of the three-dimensional shape and a result image representing an area not satisfying the first criterion in the first captured image simultaneously or selectively.

[Configuration 2]

In the image processing system (50) described in Configuration 1, the reliability calculation part (24) further calculates a second index representing the reliability for each area based on the first captured image, the reliability evaluation part (25) further evaluates whether or not the calculated second index satisfies a second criterion set in advance for each area, and the result image further represents an area not satisfying the second criterion in the first captured image.

[Configuration 3]

In the image processing system (50) described in Configuration 2, the display part (3) displays an area not satisfying the first criterion in a first form and displays an area not satisfying the second criterion in a second form.

[Configuration 4]

In the image processing system (50) described in any one of Configurations 1 to 3, the display part (3) displays the result image in a state of being superimposed on the first captured image.

[Configuration 5]

In the image processing system (50) described in any one of Configurations 1 to 3, the display part (3) displays the result image in a state of being superimposed on the measurement result.

[Configuration 6]

In the image processing system (50) described in any one of Configurations 1 to 3, a projection part (11) configured to project a spatial pattern set in advance on a subject and an imaging part (12) configured to image the target object are further included, the imaging part (12) generates the first captured image by imaging the target object in a state in which the spatial pattern is projected on the target object, the measurement part (23) detects a pattern appearing in the first captured image and measures a three-dimensional shape of the target object based on a result of the detection, the imaging part (12) generates a second captured image by further imaging the target object in a state in which the spatial pattern is not projected, and the display part (3) displays the result image in a state of being superimposed on the second captured image.

[Configuration 7]

In the image processing system (50) described in any one of Configurations 1 to 3, in a case in which imaging of the target object is performed a plurality of times, when one of a plurality of first captured images acquired through the imaging of the plurality of times is designated, the display part (3) displays the result image, which is acquired using the first captured image, in a state of being superimposed on the designated first captured image.

[Configuration 8]

In the image processing system (50) described in any one of Configurations 1 to 3, in a case in which imaging of the target object is performed a plurality of times, the display part (3) displays a plurality of result images in a state in which the result images, which are acquired using first captured images, are respectively superimposed on a plurality of the first captured images acquired through the imaging of the plurality of times.

[Configuration 9]

The image processing system (50) described in Configuration 7 or 8, the imaging of the plurality of times is imaging from mutually-different positions.

[Configuration 10]

The image processing system (50) described in Configuration 3, in the first form and the second form, colors, hatching patterns, or blinking patterns are different.

[Configuration 11]

In the image processing system (50) described in Configuration 6, the projection part (11) projects the result image onto the target object.

[Configuration 12]

In the image processing system (50) described in Configuration 2 or 3, a projection part (11) configured to project a spatial pattern set in advance on a subject and an imaging part (12) configured to image the target object are further included, the imaging part (12) generates the first captured image by imaging the target object in a state in which the spatial pattern (P) is projected on the target object, the measurement part (23) detects a pattern appearing in the first captured image and measures a three-dimensional shape of the target object based on a result of the detection, the first index is one of three indexes including an amount of light at the time of the measurement, a collapse of the pattern appearing in the first captured image, and a blurring of the pattern appearing in the first captured image, and the second index is another index different from the first index among the three indexes.

[Configuration 13]

In the image processing system (50) described in Configuration 2 or 3, in a case in which an area not satisfying the first criterion and an area not satisfying the second criterion overlap each other, the reliability evaluation part (25) further estimates whether or not an event set in advance has occurred in the overlapping area based on the measurement result for an area surrounding the overlapping area, and the result image further represents an area in which the event set in advance is determined to have occurred.

[Configuration 14]

In the image processing system (50) described in Configuration 3, in a case in which an area not satisfying the first criterion and an area not satisfying the second criterion overlap each other, the reliability evaluation part (25) identifies an index having a higher degree of lowering the reliability out of the first index and the second index based on a difference between the first index and the first criterion and a difference between the second index and the second criterion, and the display part (3) displays the result image in a form corresponding to the identified index out of the first form and the second form.

[Configuration 15]

An image processing method including: imaging a target object; measuring a three-dimensional shape of the target object based on a captured image acquired by the imaging; calculating an index representing a reliability of measurement of the three-dimensional shape for each area based on the captured image; evaluating whether or not the calculated index satisfies a criterion set in advance for each area; and displaying a measurement result of the three-dimensional shape and a result image representing an area not satisfying the criterion simultaneously or selectively.

The embodiments disclosed this time are examples in every aspect and should not be considered to be restrictive. The scope of the present disclosure is represented not in descriptions of the embodiments described above but in the claims and is intended to include all the changes within meanings and the scope of equivalents of the claims.

What is claimed is:

1. An image processing system comprising:
a hard processor configured to:
measure a three-dimensional shape of a target object based on a first captured image acquired by imaging the target object;
calculate a first index representing a reliability of measurement of the three-dimensional shape for each of areas based on the first captured image;
evaluate whether or not the calculated first index satisfies a first criterion that is set in advance for each area; and
a display part configured to display a measurement result of the three-dimensional shape and a result image representing an area not satisfying the first criterion in the first captured image simultaneously or selectively,
wherein the hardware processor is further configured to calculate a second index representing the reliability for each area based on the first captured image,
wherein the hardware processor is further configured to evaluate whether or not the calculated second index satisfies a second criterion that is set in advance for each area,
wherein the result image further represents an area not satisfying the second criterion in the first captured image,
wherein, in a case in which the area not satisfying the first criterion and the area not satisfying the second criterion overlap each other, the processor is further configured to estimate whether or not an event set in advance has occurred in the overlapping area based on the measurement result for an area surrounding the overlapping area, and
wherein the result image further represents an area in which the event set in advance is determined to have occurred.

2. The image processing system according to claim 1, wherein the display part is configured to display the area not satisfying the first criterion in a first form and displays the area not satisfying the second criterion in a second form.

3. The image processing system according to claim 2, wherein, in the first form and the second form, colors, hatching patterns, or blinking patterns are different.

4. The image processing system according to claim 2,
wherein, in a case in which the area not satisfying the first criterion and the area not satisfying the second criterion overlap each other, the processor is configured to identify an index having a higher degree of lowering the reliability out of the first index and the second index based on a difference between the first index and the first criterion and a difference between the second index and the second criterion, and
wherein the display part displays the result image in a form corresponding to the identified index out of the first form and the second form.

5. The image processing system according to claim 1, wherein the display part is configured to display the result image in a state of being superimposed on the first captured image.

6. The image processing system according to claim 1, wherein the display part is configured to display the result image in a state of being superimposed on the measurement result.

7. The image processing system according to claim 1, further comprising:
a projection part comprising a light source and configured to project a spatial pattern set in advance on a subject; and
an imaging sensor configured to image the target object,
wherein the imaging sensor is configured to generate the first captured image by imaging the target object in a state in which the spatial pattern is projected on the target object,
wherein the processor is configured to detect a pattern appearing in the first captured image and measure a three-dimensional shape of the target object based on a result of the detection,
wherein the imaging sensor is configured to generate a second captured image by further imaging the target object in a state in which the spatial pattern is not projected, and
wherein the display part displays the result image in a state of being superimposed on the second captured image.

8. The image processing system according to claim 7, wherein the projection part is configured to project the result image onto the target object.

9. The image processing system according to claim 1, wherein, in a case in which imaging the target object is performed a plurality of times, when one of a plurality of first captured images acquired through imaging a plurality of times is designated, the display part displays the result image, which is acquired using the first captured image, in a state of being superimposed on the designated first captured image.

10. The image processing system according to claim 9, wherein the imaging of the plurality of times is imaging from mutually-different positions.

11. The image processing system according to claim 1, wherein, in a case in which imaging the target object is performed a plurality of times, the display part displays a plurality of result images in a state in which result images, which are acquired using the first captured images, are respectively superimposed on a plurality of the first captured images acquired through the imaging of the plurality of times.

12. The image processing system according to claim 1, further comprising:
a projection part comprising a light source and configured to project a spatial pattern set in advance on a subject; and
an imaging sensor configured to image the target object,
wherein the imaging sensor is configured to generate the first captured image by imaging the target object in a state in which the spatial pattern is projected on the target object,
wherein the processor is configured to detect a pattern appearing in the first captured image and measure a three-dimensional shape of the target object based on a result of the detection,
wherein the first index is one of three indexes including an amount of light at the time of the measurement, a collapse of the pattern appearing in the first captured image, and a blurring of the pattern appearing in the first captured image, and
wherein the second index is another index different from the first index among the three indexes.

13. An image processing method comprising:
imaging a target object;
measuring a three-dimensional shape of the target object based on a captured image acquired by the imaging;

calculating an index representing a reliability of measurement of the three-dimensional shape for each area based on the captured image;

evaluating whether or not the calculated index satisfies a criterion set in advance for each area;

displaying a measurement result of the three-dimensional shape and a result image representing an area not satisfying the criterion simultaneously or selectively;

calculating a second index representing the reliability for each area based on the first captured image, evaluating whether or not the calculated second index satisfies a second criterion that is set in advance for each area, wherein the result image further represents an area not satisfying the second criterion in the first captured image, estimating whether or not an event set in advance has occurred in the overlapping area based on the measurement result for an area surrounding the overlapping area as the area not satisfying the first criterion and the area not satisfying the second criterion overlap each other, and wherein the result image further represents an area in which the event set in advance is determined to have occurred.

* * * * *